SPECIAL CODE TAPE READING SYSTEM

Filed Sept. 6, 1963 4 Sheets-Sheet 1

INVENTORS
RICHARD B. LAWRANCE
DAVID R. SUTTON
DOUGLAS B. AYRES
BY Fred Jacob
ATTORNEY INVENTORS
RICHARD B. LAWRANCE
DAVID R. SUTTON
DOUGLAS B. AYRES
BY Fred Jacob
ATTORNEY INVENTORS.
RICHARD B. LAWRANCE
DAVID R. SUTTON
DOUGLAS B. AYRES
BY Fred Jacob
ATTORNEY

INVENTORS.
RICHARD B. LAWRANCE
DAVID R. SUTTON
DOUGLAS B. AYRES

BY Fred Jacob
ATTORNEY

United States Patent Office 3,304,542
Patented Feb. 14, 1967

3,304,542

SPECIAL CODE TAPE READING SYSTEM

David R. Sutton, Framingham, Richard B. Lawrance, Winchester, and Douglas B. Ayres, Cochituate, Mass., assignors to Honeywell Inc., a corporation of Delaware Filed Sept. 6, 1963, Ser. No. 307,141
10 Claims. (Cl. 340—172.5)

The present invention relates in general to new and improved readout apparatus and in particular to apparatus for reading out magnetically recorded binary digital data.

In a copending application by Richard B. Lawrance et al. entitled "Data Processing Techniques," filed Dec. 21, 1962, Ser. No. 246,508, which is assigned to the assignee of the present application, a new binary information storage record is disclosed together with a method and an apparatus for producing and utilizing the same. According to the invention disclosed in the aforesaid copending application, binary digital data is recorded in digit pairs. There are four possible combinations of digits which may be arbitrarily designated $\alpha$, $\beta$, $\gamma$ and $\delta$. Each such pair consists of what may be termed a high bit and a low bit and is represented in a separate cell of the magnetic storage medium by magnetic indicia containing polarity reversals. An initiating and a terminating polarity reversal have the same direction and define the boundaries between successive cells of the storage medium. An intermediate polarity reversal, which is of an opposite direction, is spaced from the initiating polarity reversal a distance characteristic of the binary digit pair represented. In one arrangement, the magnetic indicia may be paired off to form palindromes so as to represent the same data when read in a forward or in a backward direction. For example, where $\alpha$ is the palindrome of $\delta$, and $\beta$ and $\gamma$ are palindromes, only a simple complementing step is required to permit data readout in the reverse direction. It will be understood that any of the four code combinations may be assigned to the aforesaid digit pairs.

As disclosed in the above-mentioned copending application, one technique for reading out data which is recorded in the aforesaid manner, utilizes a pair of integrators which receive direct and inverted bilevel signals corresponding to the readout signal. An amplitude comparison is made using the signals both directly and in attenuated form to determine the binary digit pair represented. Such a readout technique tends to be critically dependent on timing considerations, inasmuch as an amplitude comparison must be made just prior to the time when one of the compared waveforms returns to 0. Suddenly occurring variations of the speed of the magnetic storage medium with respect to the readout head, which may be of the order of 1 to 2% in the case of magnetic tape, may critically affect the comparison results under these conditions. This is also true of gradually occurring speed variations which may, under unfavorable conditions, be as high as 50% of normal speed. Moreover, the absence of redundancy checking of the compared combinations renders this technique vulnerable to errors incurred due to loss of data, such as may be caused by dirt, wear, or the like.

It is the primary object of the present invention to provide data readout apparatus which is not subject to the foregoing disadvantages.

It is another object of the present invention to provide apparatus for reading out magnetic indicia of binary digit pairs which is capable of detecting errors due to loss of data, variations in tape speed and the like.

It is still a further object of the present invention to provide apparatus for selectively reading out palindromic magnetic indicia of binary digit pairs in a forward or in a reverse direction.

The foregoing objects are attained in the present invention by measuring the duration between opposite polarity transitions in each cell of the storage medium as a ratio of the duration of the entire cell. Thus, gradually occurring speed variations of the magnetic tape, whether large or small, will not affect the ratio measurement. Sufficient latitude is provided so that suddenly occurring speed variations of the expected magnitude do not critically affect the readout of information. The information obtained is decoded to derive the binary digit pair represented by the magnetic indicia. The information is further checked to determine invalid readings due to any cause whatever, as well as operating conditions in excess of predetermined operating limits caused by the loss of data.

These and other novel features of the invention together with further objects and advantages thereof will become apparent from the following detailed specification with reference to the accompanying drawings in which.

Figure 1:
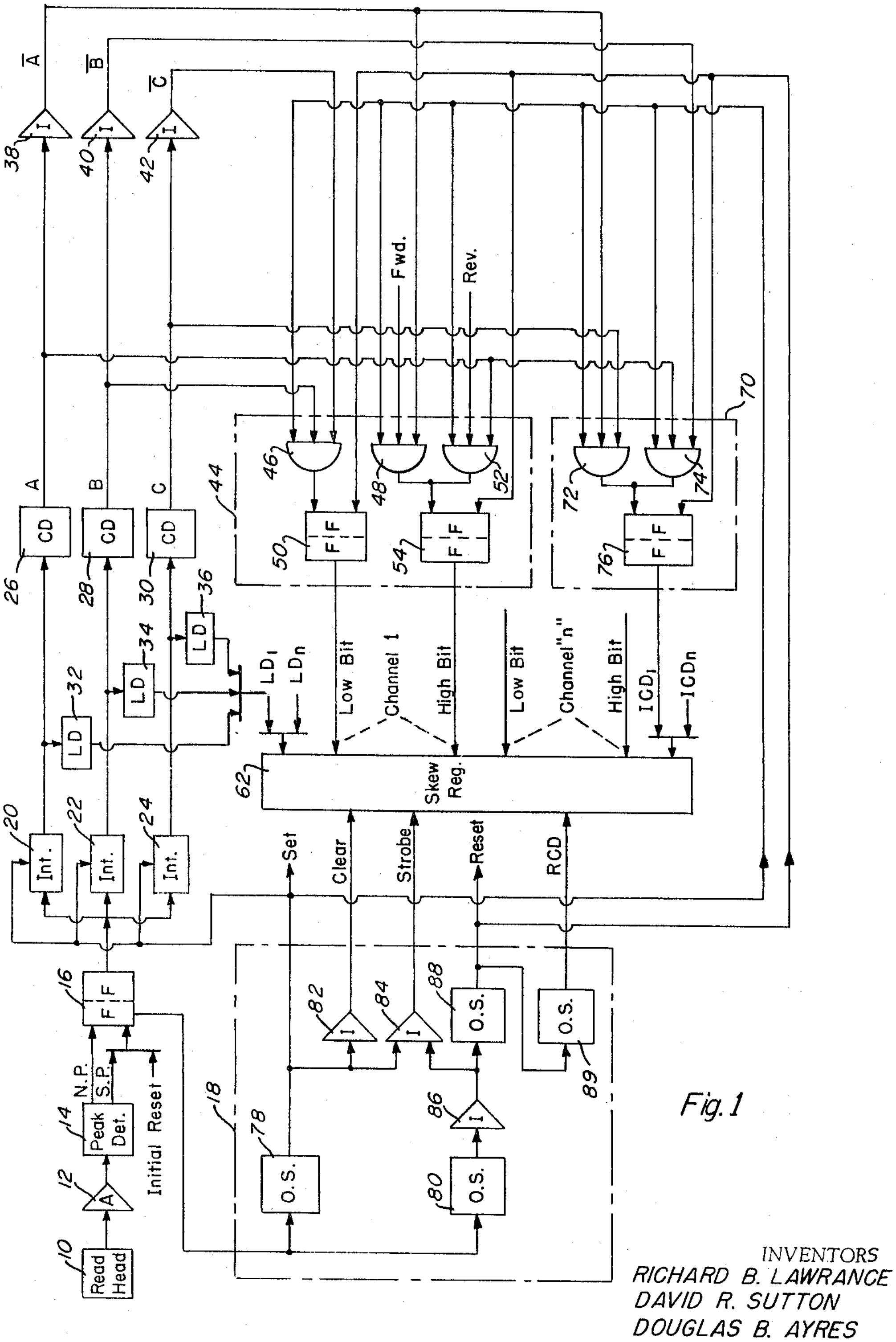
FIGURE 1 illustrates a preferred embodiment of the present invention.

With reference now to the drawings, the preferred embodiment of the invention which is illustrated in FIGURE 1 is applicable to a single data channel of the magnetic storage medium which will be assumed to be magnetic tape herein. It will be understood that the tape will normally contain a plurality of data channels. In all or some of these channels, according to the present invention, magnetic indicia are recorded in adjacent cells, each representative of one of the aforesaid binary digit pairs $\alpha$, $\beta$, $\gamma$ or $\delta$ and are organized into successive records of data.

A read head 10 is positioned to read out the magnetic indicia, its output being connected to a read amplifier 12. The latter is further coupled to a peak detector 14 which provides a pair of output signals, depending upon whether a north pole or a south pole is sensed by the read head. The north pole output is directly connected to a complementing flip-flop 16, while the south pole output is buffered together with an Initial Reset signal before being coupled to the unit 16.

The negative output of the complementing flip-flop 16 is coupled to a clock circuit 18. The assertive output of the flip-flop 16 is coupled to three separate integration circuits 20, 22 and 24 respectively, which are substantially alike except that each has its own predetermined rate of rise and fall. In the illustrated embodiment of the invention, the rise slopes of the integrators 20 and 24 are assumed to be such as to provide a rate of rise of 1 volt/$\mu$s. The fall slopes of the integrators 20 and 22 provide a rate of fall of $-1$ volt/$\mu$s. The rise rate of integrator 22 is assumed to be 0.5 volt/$\mu$s and the fall rate of integrator 24 is $-0.5$ volt/$\mu$s. Each of the integrators further receives a Set signal from the clock circuit 18 for timing purposes, as explained hereinbelow.

The outputs of the integration circuits 20, 22 and 24 are coupled to a set of level detectors 32, 34 and 36 respectively, whose outputs are buffered together to provide a level detection signal for channel 1, designated $LD_1$. The outputs of the units 20, 22 and 24 are further connected to a set of corresponding crossover detectors 26, 28 and 30 whose responsive output signals are labelled A, B and C respectively in FIGURE 1. The signals A, B and C are applied to a corresponding set of inverters 38, 40 and 42, the output signals of which are designated $\overline{A}$, $\overline{B}$ and $\overline{C}$ respectively.

A decoding circuit 44 includes a gate 46 having its output connected to the set input of a flip-flop 50, and a pair of gates 48 and 52 having their outputs buffered to the set input of a flip-flop 54. Each gate receives the aforesaid Set signal on one input leg thereof, the gate 46 further receives the B and $\overline{C}$ signals at its input. The gate 48 receives the $\overline{A}$ signal at its input, as well as a signal indicative of the forward motion of the magnetic storage medium. The gate 52 further has the A signal coupled to its input, as well as a signal indicative of the reverse motion of the storage medium. A reset signal, which is derived from the clock circuit 18, is applied to the reset input of each of the flip-flops 50 and 54 respectively. The outputs of the latter flip-flops provide the low-bit and high-bit signals respectively of the information channel 1 and are applied, as such, to a skew register 62. The skew register may consist of a number of shift registers operating in synchronism so as to accept information in parallel.

Under normal circumstances, data will be simultaneously read out from more than one channel of the magnetic tape. For example, a frame of data may be read out of six channels on the tape, the derivative data from all channels being applied to the skew register. Such additional inputs of the skew register are designated Channel "*n*" in FIGURE 1, and it will be understood that each additional channel is substantially like that described above. The signal $LD_1$ which is representative of the output of the level detectors associated with Channel 1, is buffered together with similar signals corresponding to the remaining channels and designated $LD_n$ in FIGURE 1, the buffer output being applied to the skew register 62.

A decoding circuit 70 constitutes an invalid character detector and consists of a pair of gates 72 and 74 each of which has a Set signal applied to its input. The gate 72 further receives the $\overline{A}$ and C signals at its input, while the gate 74 has the A and $\overline{B}$ signals applied thereto. The outputs of the gates 72 and 74 are jointly buffered to the set input of a flip-flop circuit 76, which additionally has the aforesaid Reset signal applied thereto. The output signal of the flip-flop 76 is representative of an invalid character detection in Channel 1 and is accordingly labelled $ICD_1$. The corresponding signals of the remaining channels are designated $ICD_n$ and are jointly buffered with $ICD_1$ to the input of the skew register 62.

The input of the clock circuit 18, which is derived from the negative output of the complementing flip-flop 16, is applied to a pair of one-shot multivibrators 78 and 80 which are assumed to have time intervals of 0.5 $\mu$s. and 2 $\mu$s. respectively in the preferred embodiment of the invention. The aforesaid Set signal is derived from the output of the multivibrator 78, the latter being further coupled to the input of a pair of inverters 82 and 84 respectively. The output of the inverter 82 is designated as the Clear signal and is applied to the skew register 62. The output of the multivibrator 80 is coupled to an inverter 86 whose output, in turn, is applied to the aforesaid inverter 84. The output signal of the inverter 84 is labelled Strobe signal and is applied to the skew register 62. The output of the inverter 86 is further coupled to a one-shot multivibrator 88, which is assumed to have a time interval of 0.5 $\mu$s. in the preferred embodiment. The aforesaid Reset signal is obtained at the output of the latter multivibrator and is further applied to a delay unit 89 in the form of a resettable one-shot multivibrator. A record detection signal RCD is derived at the output of the unit 89 and is applied to the skew register 62.

Figure 2:
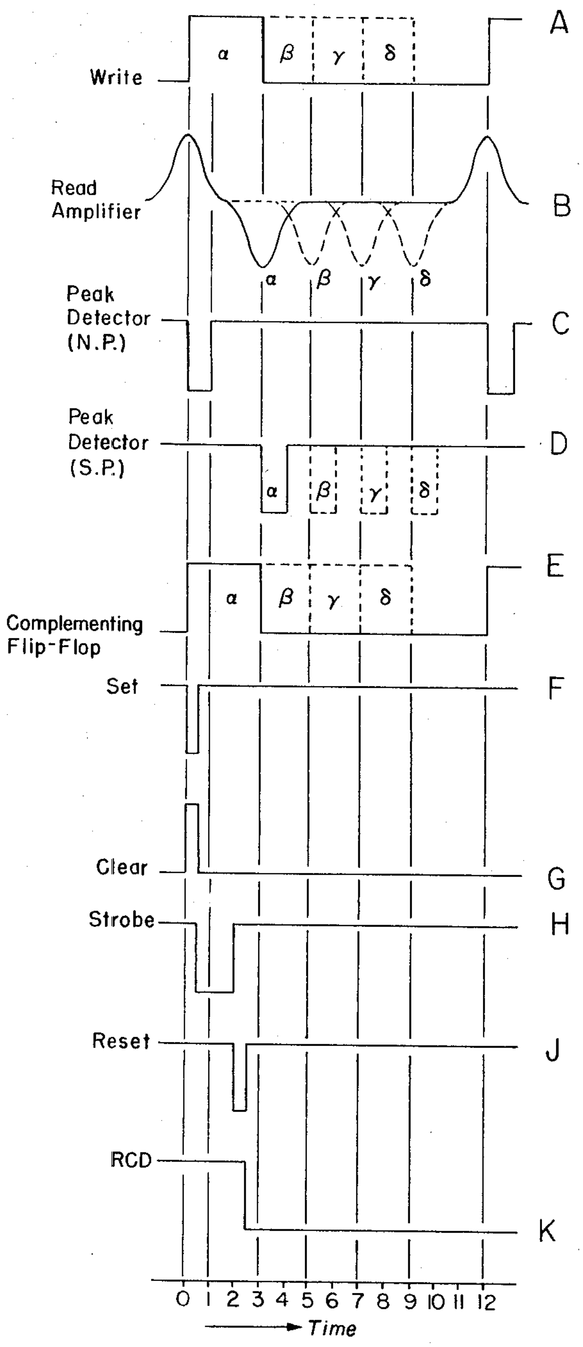
FIGURES 2–6 illustrate various waveforms which are pertinent to an understanding of the operation of the apparatus of FIGURE 1.

The operation of the apparatus of FIGURE 1 will now be explained with reference to the waveforms of FIGURES 2–6. FIGURE 2A illustrates the bilevel Write signal for recording magnetic indicia on tape in a 12-part clock interval. In the present embodiment of the invention each part of the clock interval is assumed to have a duration of 1 $\mu$s. The Write signal is seen to have positive transitions at the initiation and at the termination of the clock interval for each of the binary digit combinations $\alpha$, $\beta$, $\gamma$ and $\delta$. The spacing of the negative transitions from the initiating transition uniquely determines the particular binary digit combinations represented. For the binary digit combination $\alpha$ which will be assumed to be equivalent to the binary digit combination 00, the negative transition is seen to occur at time 3, i.e. three $\mu$s. after the initiation of the clock interval. In accordance with the explanation given in the aforesaid copending application of Richard B. Lawrance et al., Ser. No. 246,508, with respect to palindromes, the binary digit combination $\delta$ which has a negative transition at time 9, constitutes the palindrome of $\alpha$ and is assumed herein to be representative of the digit combination 10. Similarly, the binary digit combination $\beta$ has a negative transition at time 5, while its palindrome $\gamma$ has a negative transition at time 7. Under the assumed conditions, $\beta$ and $\gamma$ will represent the binary digit combinations 01 and 11 respectively.

When the Write signal is recorded on magnetic tape, magnetic indicia are formed which have polarity reversals corresponding in time and direction to the aforesaid transitions. The polarity reversals recorded at the beginning and end of each clock interval serve to define the boundaries between each storage cell on the magnetic tape which contains one of the aforesaid magnetic indicia and the preceding and succeeding cells. FIGURE 2B illustrates the signal which appears at the output of the read amplifier 12 when the recorded magnetic indicia are read out by the read head 10. The waveform shown in FIGURE 2B represents a readout signal under ideal conditions. It will be understood that the nature of the waveform may change, depending on the data storage density on the storage medium and other conditions, provided only that the waveform remains distinguishable in its information content. It will be seen that north poles occur at times 0 and 12, while south poles occur at times 3, 5, 7 or 9, depending on which binary digit combination is represented in the particular storage cell which is read out.

FIGURE 2C shows the output of the peak detector in response to sensed north poles, while FIGURE 2D illustrates the peak detector output in response to sensed south poles. These output signals, upon being applied to the complementing flip-flop 16, produce a bilevel data signal which appears in FIGURE 2E and which is seen to be equivalent to the Write signal shown above in FIGURE 2A.

FIGURE 2 further illustrates the derivation of the various timing signals provided by the clock circuit 18. The application of the negative output signal of the flip-flop circuit 16 to the one-shot multivibrator 78 results in the Set signal which is illustrated in FIGURE 2F and which is seen to constitute a 0.5 $\mu$s. pulse. The Clear signal, which is used to clear the skew register 62, is shown in FIGURE 2G and is seen to be the inverse of the Set signal. The Strobe signal, which is illustrated in FIGURE 2H, is initiated at the termination of the Set signal and ends 2 $\mu$s. later, as determined by the multivibrator 80. The inverted output of the multivibrator 80 is further applied to the multivibrator 88, whence it produces the Reset signal which is initiated at the termination of the Strobe signal and which has a duration of 0.5 μs., as shown in FIGURE 2J. The record detection signal RCD, which is shown in FIGURE 2K, is initiated at the beginning of the first Reset pulse in the record and remains negative as long as Reset pulses are periodically received within a predetermined delay interval. The latter extends at least one storage cell width beyond the termination of the last Reset pulse of the record which is initiated by the end boundary transition of the last storage cell in the record.

Figure 3:
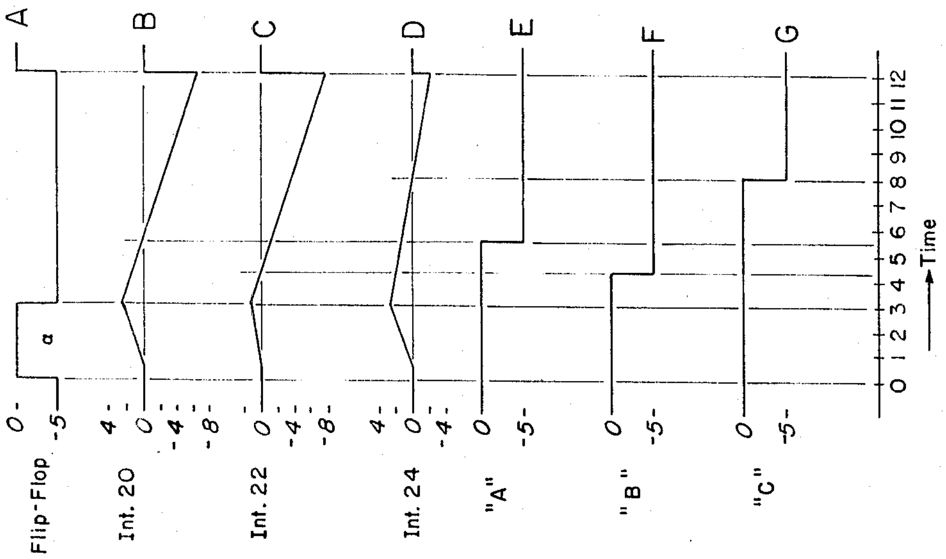
Figure 6:
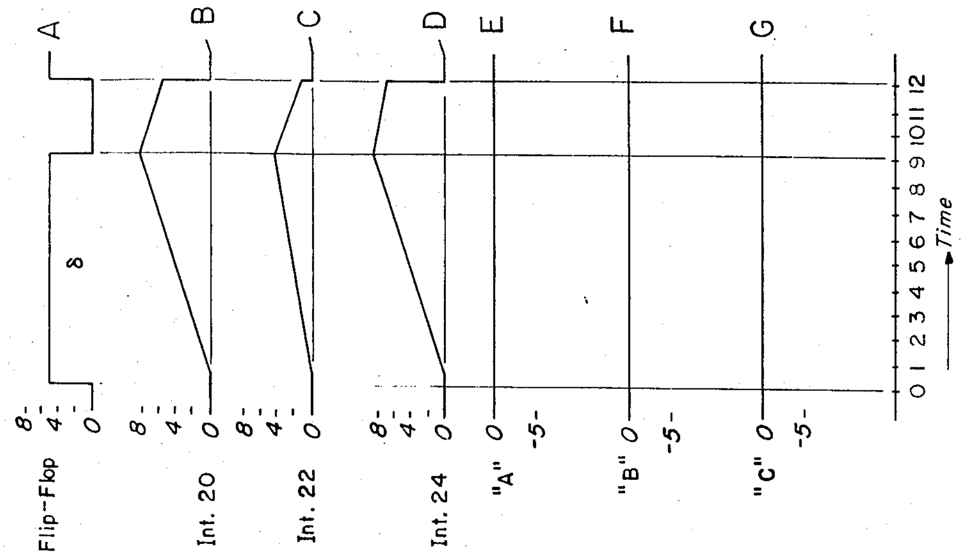
Figure 5:
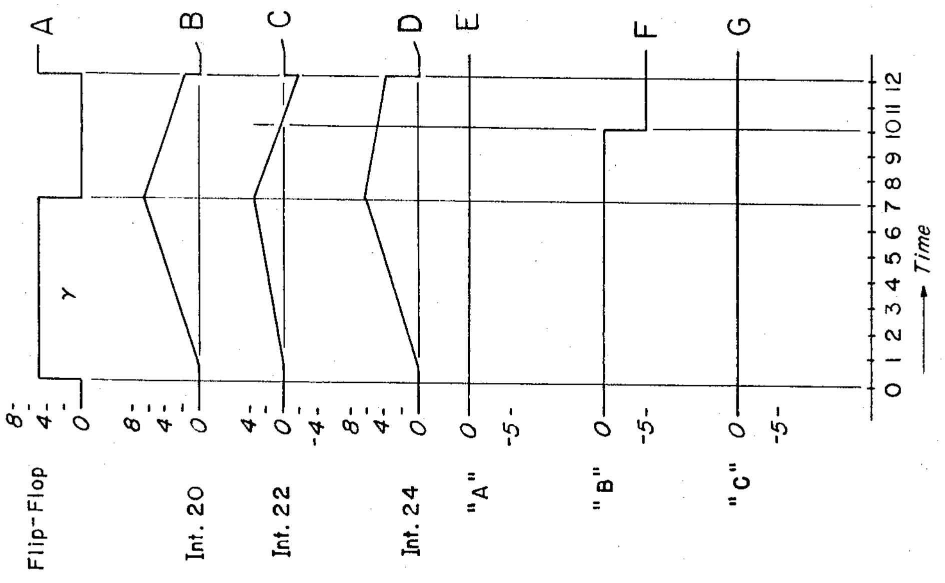

FIGURE 3 illustrates the derivation of the above-mentioned A, B and C signals for the digit combination $\alpha$, the representative bilevel data output signal of the flip-flop 16 being shown in FIGURE 3A. The integration signal which appears at the output of the integration circuit 20 appears in FIGURE 3B. It is seen to remain 0 for 0.5 μs. following the initiation of the clock interval owing to the duration of the Set pulse which serves to clear the integration circuit. At time 0.5 the rise portion of the waveform is initiated and continues until a maximum of 2.5 volts is reached at time 3, when the output signal of the flip-flop 16 reverts from 0 to the −5 volt level. Subsequently, the output waveform of the integrator 20 begins to fall at the rate of 1 volt/μs. A crossover occurs approximately at time 5.5, but the waveform continues to fall until the end of the clock interval at time 12 when it attains a minimum voltage of −6.5 volts. At that time the application of the Set pulse returns the integration signal to zero. Simultaneously, the flip-flop 16 initiates the data signal corresponding to the binary digit combination which is recorded in the subsequent storage cell on the tape.

FIGURE 3C illustrates the action of the integrator 22 in response to the aforesaid $\alpha$ signal. The rate of rise of the waveform of integrator 22 is 0.5 volt/μs, while its rate of fall is identical to that of integrator 20. After a 0.5 μs. delay, the waveform is seen to rise to a maximum of 1.25 volts at time 3 and thereafter it declines to a minimum of −7.75 volts at time 12. The crossover point occurs at approximately time 4.25.

FIGURE 3D illustrates the responsive waveform of the integrator circuit 24 to the aforesaid $\alpha$ signal shown in FIGURE 3A. In this case, the slope of the rising portion of the waveform is identical to that of integrator 20, while the slope of the falling portion is −0.5 volt/μs. A maximum of 2.5 volts is reached at time 3 and a minimum of −2 volts occurs at time 12. In this case, the crossover point occurs at time 8.

The waveforms 3E, 3F and 3G illustrate the output signals of the crossover detectors 26, 28 and 30 respectively, for the above-discussed integration signals corresponding to the binary digit combination $\alpha$. In each instance the output signal of the crossover detectors is a bilevel one, a transition occurring whenever a crossover occurs in the corresponding integration signal. Thus, the waveform labelled "A" which appears at the output of the crossover detector 26 and which is illustrated in FIGURE 3E, displays a transition from 0 volt to −5 volts at time 5.5, when a crossover occurs in the corresponding waveform shown in FIGURE 3B. Similarly, the waveform designated "B" in FIGURE 3F shows a transition at time 4.25 corresponding to the simultaneous crossover of the waveform illustrated in FIGURE 3C. The waveform labelled "C" in FIGURE 3G shows a transition at time 8, corresponding to the crossover of the integration signal which appears in FIGURE 3D.

Figure 4:
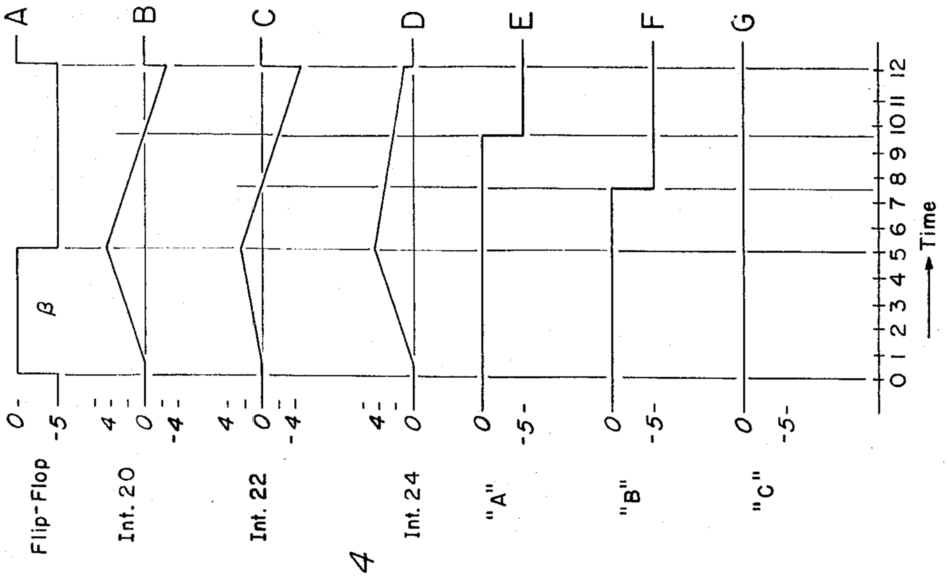

FIGURE 4 illustrates the waveforms of the integrator output signals and of the corresponding crossover detector signals for the binary digit combination $\beta$. The representative data signal derived at the output of the flip-flop circuit 16 appears in FIGURE 4A and has a negative transition at time 5. Accordingly, the output waveform of the integrator 20, as shown in FIGURE 4B, reaches a maximum voltage of 4.5 volts at time 5 and then falls to a minimum of −2.5 volts at time 12 before returning to 0. A polarity crossover occurs approximately at time 9.5 which results in a transition of the signal "A" at the same time, as illustrated in FIGURE 4E.

As indicated in FIGURE 4C, the output signal of the integrator 22 which rises at the rate of 0.5 volt per microsecond, reaches a maximum of 2.25 volts at time 5 and then declines at the rate of 1 volt/μs. to −4.75 volts at time 12, whence it is returned to 0. The crossover point occurs at approximately time 7.3 as further shown by the simultaneously occurring transition in the waveform B in FIGURE 4F.

In the case of integrator 24, the output signal, which is shown in FIGURE 4D, reaches a maximum of 4.5 volts at time 5 and then declines at 0.5 volt per microsecond to an amplitude of 1 volt at time 12, so that no crossover occurs during the clock interval. The resultant crossover detector signal C, which is shown in FIGURE 4G, therefore remains at the 0 voltage level throughout the entire clock interval.

FIGURE 5A illustrates the output waveform of the flip-flop 16 for the binary digit combination $\gamma$ which has a negative transition occurring at time 7. The responsive output signal of the integrator A, which appears in FIGURE 5B, rises to 6.5 volts at time 7 and falls at the same rate thereafter until it reaches 1.5 volts at time 12. Since no crossover occurs during this clock interval, there is a corresponding absence of a transition in the waveform E which is shown in FIGURE 5E. The waveform of FIGURE 5C, which represents the output signal of the integrator 22, reaches a maximum of 3.25 volts at time 7 and thereafter falls to −1.75 volts at time 12. A crossover occurs at slightly before time 10, as further indicated by the corresponding transition of the waveform B in FIGURE 5F.

The waveform of FIGURE 5D, which represents the output signal of the integrator 24, reaches a maximum of 6.5 volts at time 7 and thereafter declines to 4 volts at time 12. Here again, since no crossover occurs during the entire clock interval, the output signal "C" of the crossover detector 30, which is shown in FIGURE 5G, remains at the 0 voltage level. It will be noted that the waveforms of FIGURES 5E and 5G are identical for the binary digit combination $\gamma$, even though the output signals of the corresponding integrators are not alike.

FIGURE 6A illustrates the data signal at the output of the flip-flop 16 for the binary digit combination $\delta$ which is seen to have a negative transition at time 9. The output signal of the integrator 20, which is shown in FIGURE 6B, attains a maximum of 8.5 volts at time 9 and thereafter declines to 5.5 volts at time 12 before being returned to 0. The integration signal which is shown in FIGURE 6C reaches a maximum of 4.25 volts and declines to 1.25 volts at time 12 before being returned to 0. The maximum voltage attained by the output signal of the integrator 24, which is illustrated in FIGURE 6D, is 8.5 volts and the signal subsequently falls to 7 volts at the end of the clock interval and then returns to 0.

It will be noted that none of the integrator output signals for the binary digit combination $\delta$ have a crossover during the clock interval. Accordingly, the corresponding A, B and C signals obtained at the output of the crossover detectors 26, 28 and 30 respectively, remain at the 0 voltage level throughout the entire clock interval. This is illustrated by the waveforms of FIGURES 6E, 6F and 6G respectively.

The output signals of the crossover detectors 26, 28 and 30 and of the inverters 38, 40 and 42, are coupled to the gates of the decoding circuits 44 and 70 respectively in accordance with the following equations:

| Forward | Reverse |
|---|---|
| High Bit: $\overline{A}$ | High Bit: $A$ |
| Low Bit: $B\overline{C}$ | Low Bit: $B\overline{C}$ |
| ICD: $\overline{A}C+A\overline{B}$ | ICD: $\overline{A}C+A\overline{B}$ |

The table below illustrates the response of the circuits 44 and 70 for forward and reverse motion of the storage medium.

| | No. | Signals | | | High Bit | Low Bit | ICD | Bit Comb. |
|---|---|---|---|---|---|---|---|---|
| | | A | B | C | | | | |
| Forward | 1 | 0 | 0 | 0 | 1 | 0 | 0 | δ |
| | 2 | 0 | 0 | 1 | -------- | -------- | 1 | |
| | 3 | 0 | 1 | 0 | 1 | 1 | 0 | γ |
| | 4 | 0 | 1 | 1 | -------- | -------- | 1 | |
| | 5 | 1 | 0 | 0 | -------- | -------- | 1 | |
| | 6 | 1 | 0 | 1 | -------- | -------- | 1 | |
| | 7 | 1 | 1 | 0 | 0 | 1 | 0 | β |
| | 8 | 1 | 1 | 1 | 0 | 0 | 0 | α |
| Reverse | 1 | 0 | 0 | 0 | 0 | 0 | 0 | α |
| | 2 | 0 | 0 | 1 | -------- | -------- | 1 | |
| | 3 | 0 | 1 | 0 | 0 | 1 | 0 | β |
| | 4 | 0 | 1 | 1 | -------- | -------- | 1 | |
| | 5 | 1 | 0 | 0 | -------- | -------- | 1 | |
| | 6 | 1 | 0 | 1 | -------- | -------- | 1 | |
| | 7 | 1 | 1 | 0 | 1 | 1 | 0 | γ |
| | 8 | 1 | 1 | 1 | 1 | 0 | 0 | δ |

It will be noted that eight combinations of the signals A, B and C exist for which it is possible to derive a bit combination in the forward and in the reverse mode of operation. Only the signal combinations 1, 3, 7 and 8 are valid ones and these will normally occur in the absence of errors. The corresponding low and high bits are indicated in the table, together with the chosen designation of the bit combination. The signal combinations 2, 4, 5 and 6 are invalid and the $ICD_1$ signal which is generated by the flip-flop 76 in response thereto is ONE. The latter signal is applied to the skew register 62 jointly with ICD signals generated in the remaining channels.

As previously explained, the level detectors 32, 34 and 36 are connected respectively to the outputs of the integrators 20, 22 and 24. Without so limiting the invention, the level detector 32 in the illustrated embodiment may be set at the limits +12 volts and −9 volts so as to provide an LD signal indication when either of these levels is exceeded. The level detector 34 may be set at the limits +7 volts and −10 volts, and the level detector 36 may be set at the limits +12 volts and −4 volts.

While the limits chosen may be subject to change in accordance with the nature of the level detectors, they are selected to provide an indicating signal whenever a transition of the recorded magnetic indicia goes undetected for any reason, such as dirt between the storage medium and the magnetic head, wear, etc. The choice of these limits is such, however, that sufficient latitude is provided to permit a variation in the relative speed of the storage medium and the reading head by at least a factor of 1.25.

Each of the level detector limits is chosen to provide a warning signal which supplements the ICD signal in the event that an integrator fails to respond to a given transition either from lack of detection, e.g., due to dirt on tape, incompletely recorded data, etc., or from component failure.

The outputs of the level detectors associated with all the data channels are effectively buffered to a single input of the skew register. Thus, if a condition occurs where any one of the level detectors senses an integration signal having an amplitude in excess of the preset limits, an appropriate indicating signal LD is applied to the skew register.

The signals A, B and C, insofar as they were switched to the −5 volt level, remain at that level one μs. beyond the termination of the clock interval before they return to the 0 volt level. This obviously applies also to the signals $\overline{A}$, $\overline{B}$ and $\overline{C}$. This delay permits the Set pulse, which occurs between time 0 and 0.5 of the clock interval, to strobe the aforesaid signals into the gates 46, 48 and 52 so as to actuate the flip-flops 50 and 54. The Set signal performs a similar strobing function in the case of the gates 72 and 74 so as to actuate the flip-flop circuit 76.

A Clear signal is generated simultaneously with the Set signal and is applied to the skew register 62 to clear the latter for the arrival of new data from the decoder. The subsequently applied Strobe signal, which occurs between time 0.5 and 2, reads a frame of data that is jointly derived from all channels into the skew register, together with the associated ICD and LD information. The subsequent Reset signal, which occurs between time 2 and 2.5, resets the flip-flops 50, 54 and 76.

From FIGURE 3A it will be seen that the earliest possible transition (corresponding to the binary digit combination α), which can follow a Reset signal, can occur only at time 3. Thus a safety time interval exists to accommodate any instantaneous magnetic tape speed changes which may occur. Due to the mechanical inertia of the tape drive, such instantaneous speed changes will at most be of the order of 1–2% of the existing tape speed and will therefore not affect the accuracy of data readout. As pointed out above, more radical departures from the normal speed may occur, but at a more gradual rate. In the latter case, the time of occurrence of the pulses produced by the clock circuit would vary proportionately since they are initiated by the transitions of the output signal of the flip-flop circuit 16 and any adverse effect upon the data readout operation is prevented.

From the foregoing description and illustration of a preferred embodiment of the invention it will be clear that the invention may take different forms. For example, the timing signals provided by the clock circuit may be varied and the clock circuit 18 itself is susceptible of different embodiments. This also applies to the integrating circuits 20, 22 and 24 provided only that the desired integration rates of rise and fall are provided. For example, integration may proceed by charging a capacitor (or a group of capacitors) through a resistance of one value and discharging it through a resistance of a different value so as to obtain different charging and discharging time constants. Alternatively, constant current integration may be resorted to, whereby oppositely poled currents of different amplitudes are used to charge and discharge a capacitor or other storage device.

Each level detector will consist essentially of a threshold device which is sensitive to a predetermined signal level. Numerous devices of this type are presently available and the invention is not limited to any particular level detection circuit. Similarly, crossover detectors and peak detectors are well-known in the art and hence the illustration of any particular circuit of this kind is deemed to be unnecessary.

The skew register is a temporary storage device whose function it is to collect the data from the respective data channels which may arrive out of phase with each other. As shown in FIGURE 1, level detection signals and invalid character detection signals are stored in the skew register in association with the corresponding data frame obtained from the data channels. It will be obvious to those skilled in the art that the LD and ICD information may be used in any desired manner to modify the associated frame of data, to discard it, to reconstruct it, or to otherwise operate upon it.

It will be apparent from the foregoing disclosure of the invention that numerous modifications, changes and equivalents will now occur to those skilled in the art, all of which fall within the true spirit and scope contemplated by the invention.

What is claimed is:

1. Apparatus for reading out magnetic indicia serially recorded in successive cells of a magnetic storage medium, each of said magnetic indicia including a first polarity reversal defining the boundary between successive cells and a second oppositely directed polarity reversal spaced from said first polarity reversal a distance characteristic of the data represented by said magnetic indicia, means responsive to each of said magnetic indicia to derive a data signal having a predetermined signal level of a duration corresponding to said characteristic distance, first, second and third integrating circuits each having characteristic rates of rise and fall, means for simultaneously applying said data signal to said integration circuits to derive an integration signal from each, crossover detection means responsive to said integration signals to provide corresponding output signals, and decoding means responsive to said output signals to derive a pair of bilevel signals jointly representative of the data which corresponds to said magnetic indicia.

2. Apparatus for reading out magnetic indicia serially recorded in successive cells of a magnetic storage medium, the boundaries of each of said cells being defined by a pair of like-directed polarity reversals, each of said cells further including an intermediate, oppositely directed polarity reversal spaced from the cell-initiating polarity reversal a distance characteristic of the data represented by said magnetic indicia, comprising means responsive to said magnetic indicia for deriving a data signal characterized by transitions corresponding to said polarity reversals, integrating means energized by said data signal to provide a plurality of integration signals, crossover-responsive means connected to receive each of said integration signals to provide corresponding output signals, and means for decoding said output signals to derive signals representative of said magnetic indicia.

3. Apparatus for reading out indicia serially arranged in successive cells of a storage medium, each of said indicia including a first transition indicative of the boundary between successive cells and a second opposite transition spaced from said first transition a distance characteristic of the data represented by said indicia, comprising means responsive to each of said indicia to provide a data signal having a predetermined signal level with a duration corresponding to said characteristic distance, first, second and third integrating circuits each having different rates of rise and fall, means for simultaneously applying said data signal to said integration circuits, crossover detection means connected to receive signals from each of said integration circuits and adapted to provide a corresponding bilevel output signal having a change of signal levels in accordance with each detected crossover, and decoding means responsive to said bilevel output signals to derive a pair of bilevel signals jointly representative of the data corresponding to said indicia.

4. Apparatus for reading out magnetic indicia representative of four possible combinations of a pair of binary digits, said indicia being serially recorded in successive cells of a magnetic storage medium, each of said magnetic indicia including a first polarity reversal defining the boundary between successive cells and a second oppositely directed polarity reversal spaced from said first polarity reversal a distance characteristic of the digit combination represented by said magnetic indicia, comprising means responsive to each of said magnetic indicia to provide a data signal having a predetermined signal level of a duration corresponding to said characteristic distance, first, second and third integrating circuits each having different rates of rise and fall, means for simultaneously applying said data signal to said integration circuits, a signal crossover detector coupled to the output of each of said integration circuits adapted to provide a direct bilevel output signal, each of said output signals displaying signal level changes corresponding to detected crossovers, means for inverting each of said last-recited signals, decoding means responsive to a first set of said direct and inverted bilevel output signals to derive a pair of signals jointly representative of the binary digit pair which corresponds to said magnetic indicia, means responsive to a second set of said output signals to derive a single signal indicative of the validity of said first set of output signals, and temporary storage means for storing said single signal in association with its corresponding pair of signals.

5. The apparatus of claim 4 and further comprising signal level detection means energized from the output of each of said integration circuits to provide an indicating signal when predetermined limits are exceeded, and means for storing said indicating signals in said temporary storage means in association with said pair of signals corresponding thereto.

6. The apparatus of claim 4 and further comprising means selectively responsive to said forward and reverse readout of said storage medium for coupling first and second groups respectively of said first set of output signals to said decoding means.

7. Apparatus for reading out a plurality of channels of a magnetic storage medium, each channel having magnetic indicia serially recorded in adjacent cells, said indicia being respectively representative of one of four possible combinations of a pair of binary digits, each of said magnetic indicia including a first polarity reversal defining the boundary between the present and the preceding cells and a second oppositely directed polarity reversal spaced from said first polarity reversal a distance characteristic of the digit combination represented, comprising for each channel a magnetic read head positioned at a readout station, amplifying and peak detection means coupled to said read head, a first flip-flop circuit connected to said last-recited means to provide a responsive bilevel data signal having transitions corresponding to said polarity reversals, a clock circuit coupled to said first flip-flop circuit adapted to provide timing signals, first, second and third integrating circuits having different rates of rise and fall, means for simultaneously energizing each of said last-recited circuits from said first flip-flop circuit to provide separate integration signals, means for terminating said integration signals with said timing signals, first, second and third crossover detection means respectively coupled to corresponding ones of said integrating circuits and adapted to provide direct and inverted output signals displaying a change of signal levels in response to each detected crossover, decoding means responsive to a first set of said direct and inverted output signals to derive a pair of signals jointly representative of the binary digit pair which corresponds to the magnetic indicia read out for said channel, detection means responsive to a second set of said direct and inverted output signals to derive a signal indicative of the validity of said first set of output signals, means for applying said output signals to said decoding and detection means respectively in synchronism with said timing signals, buffering means connected to receive validity indication signals derived from all of said channels to provide a single responsive signal, a register, and means for separately storing respective signal pairs derived from all of said channels in said register in association with said single signal.

8. The apparatus of claim 7 wherein the rate of rise of said first and third integrating circuit respectively is twice that of the corresponding rate of rise of said second integrating circuit and the rate of fall of said first and second integrating circuit respectively is twice that of the corresponding rate of fall of said third integrating circuit.

9. The apparatus of claim 8 and further including in each channel separate signal level detection means connected to the output of each of said integrator circuits, said last-recited means being adapted to provide a level detection signal when predetermined signal limits are exceeded, and means for jointly buffering the level detection signals derived from all of said channels to said register for storage therein in association with corresponding ones of said signal pairs.

10. The apparatus of claim 7 wherein said decoding means comprises a second flip-flop circuit energized in accordance with the relationship $B\overline{C}$, said decoding means further including a third flip-flop circuit energized in accordance with the relationship $\overline{A}$ and A respectively for forward and reverse motion of said storage medium, said detection means comprising a fourth flip-flop circuit energized in accordance with the relationship $A\overline{B}+\overline{A}C$; where A, $\overline{A}$; B, $\overline{B}$ and C, $\overline{C}$ constitute the direct and inverted output signals respectively of said first, second and third crossover detectors.

References Cited by the Examiner

UNITED STATES PATENTS

| | | | |
|---|---|---|---|
| 2,887,674 | 5/1959 | Greene | 340—174 |
| 2,951,222 | 8/1960 | Amdahl et al. | 340—172.5 |

ROBERT C. BAILEY, *Primary Examiner.*

I. S. KAVRUKOV, *Assistant Examiner.*